US011951453B2

(12) United States Patent
Dong et al.

(10) Patent No.: US 11,951,453 B2
(45) Date of Patent: Apr. 9, 2024

(54) SUPERFICIALLY POROUS PARTICLES AND METHODS FOR FORMING SUPERFICIALLY POROUS PARTICLES

(71) Applicant: RESTEK CORPORATION, Bellefonte, PA (US)

(72) Inventors: Hanjiang Dong, Bellefonte, PA (US); Edward G. Franklin, Chicago, IL (US); Charles Vernon Bartlett, Snow Shoe, PA (US)

(73) Assignee: RESTEK CORORATION, Bellefonte, PA (US)

( * ) Notice: Subject to any disclaimer, the term of this patent is extended or adjusted under 35 U.S.C. 154(b) by 827 days.

(21) Appl. No.: 16/961,514

(22) PCT Filed: Jan. 11, 2019

(86) PCT No.: PCT/US2019/013207
§ 371 (c)(1),
(2) Date: Jul. 10, 2020

(87) PCT Pub. No.: WO2019/140198
PCT Pub. Date: Jul. 18, 2019

(65) Prior Publication Data
US 2020/0338528 A1 Oct. 29, 2020

Related U.S. Application Data

(60) Provisional application No. 62/616,755, filed on Jan. 12, 2018.

(51) Int. Cl.
*B01J 20/283* (2006.01)
*B01J 20/10* (2006.01)
(Continued)

(52) U.S. Cl.
CPC ........... *B01J 20/283* (2013.01); *B01J 20/103* (2013.01); *B01J 20/28011* (2013.01);
(Continued)

(58) Field of Classification Search
CPC .. B01J 20/283; B01J 20/103; B01J 20/28011; B01J 20/28057; B01J 20/28069;
(Continued)

(56) References Cited

U.S. PATENT DOCUMENTS 3,634,558 A    1/1972  Stober
4,477,492 A   10/1984  Bergna et al.
(Continued)

FOREIGN PATENT DOCUMENTS

EP       0272904 A2    6/1988
WO    2010/061367 A2   6/2010

OTHER PUBLICATIONS

Dong et al (One-pot synthesis of silica core-shell particles with double shells and different pore orientations from their nonporous counterparts, Journal of Materials Chemistry, 2012) (Year: 2012).*
(Continued)

*Primary Examiner* — Colin W. Slifka
*Assistant Examiner* — Logan Edward Laclair
(74) *Attorney, Agent, or Firm* — McNees Wallace & Nurick LLC

(57) ABSTRACT

Superficially porous particles are disclosed, each including a solid core and a layered porous shell. The layered porous shell includes a porous inner layer and at least one porous outer layer, a shell skeleton thickness greater than 1 nm, and constitutes from 10 vol % to 90 vol % of the plurality of superficially porous particles. The porous inner layer includes an inner layer thickness of less than 300 nm. The at least one porous outer layer includes a cumulative outer layer thickness ranging from 1 to 100 times the inner layer
(Continued)

thickness, a predominately radial pore orientation, and an outer layer pore structure which is more organized than the inner layer pore structure. A layer-by-layer process for forming a plurality of superficially porous particles with layered structure is disclosed. A post-modification process for preparing a plurality of chromatographically enhanced superficially porous properties is also disclosed.

20 Claims, 7 Drawing Sheets

(51) Int. Cl.
    *B01J 20/28*     (2006.01)
    *B01J 20/289*     (2006.01)
    *B01J 20/30*     (2006.01)
    *B01J 20/32*     (2006.01)

(52) U.S. Cl.
    CPC ... *B01J 20/28057* (2013.01); *B01J 20/28069* (2013.01); *B01J 20/28078* (2013.01); *B01J 20/289* (2013.01); *B01J 20/3057* (2013.01); *B01J 20/3078* (2013.01); *B01J 20/3257* (2013.01)

(58) Field of Classification Search
    CPC ............... B01J 20/28078; B01J 20/289; B01J 20/3057; B01J 20/3078; B01J 20/3257; B01J 20/3295; B01J 20/3289
    See application file for complete search history.

(56) References Cited

U.S. PATENT DOCUMENTS

| | | | |
|---|---|---|---|
| 4,775,520 A | 10/1988 | Unger et al. | |
| 4,874,518 A | 10/1989 | Kirkland et al. | |
| 5,441,530 A | 8/1995 | Landry et al. | |
| 8,685,283 B2 | 4/2014 | Wei et al. | |
| 8,864,988 B2 | 10/2014 | Chen et al. | |
| 2007/0189944 A1 | 8/2007 | Kirkland et al. | |
| 2009/0297853 A1 | 12/2009 | Kirkland et al. | |
| 2011/0253643 A1 | 10/2011 | Polshettiwar et al. | |
| 2015/0206619 A1 | 7/2015 | Fukui et al. | |
| 2017/0282155 A1* | 10/2017 | Wei .................... | B01J 20/28083 |

OTHER PUBLICATIONS

Schrader et al (Surface chemical heterogeneity modulates silica surface hydration, PNAS, 2018) (Year: 2018).*
Deridder et al., "A theoretical study on the advantage of core-shell particles with radially-oriented mesopores", J. Chromatogr. A, vol. 1456, pp. 137-144 (2016).
Gritti, "Impact of straight, unconnected, radially-oriented, and tapered mesopores on column efficiency: A theoretical investigation", J. Chromatogr. A, vol. 1485, pp. 70-81 (2017).
Moon et al., "Formation of Wrinkled Silica Mesostructures Based on the Phase Behavior of Pseudoternary Systems", Langmuir, vol. 30, pp. 15574-15580, (2014).
Qu et al., "Silica Microspheres with Fibrous Shells: Synthesis and Application in HPLC", Anal. Chem., vol. 87, pp. 9631-9638 (2015).
Shen et al., "Biphase Stratification Approach to Three-Dimensional Dendritic Biodegradable Mesoporous Silica Nanospheres", Nano Lett., vol. 14, pp. 923-932 (2014).
Wahab et al., "Fundamental and Practical Insights on the Packing of Modern High-Efficiency Analytical and Capillary Columns", Anal. Chem., vol. 89, pp. 8177-8191 (2017).
Wei et al., "Synthesis, characterization, and evaluation of a superficially porous particle with unique, elongated pore channels normal to the surface", J. Chromatogr. A, vol. 1440, pp. 55-65 (2016).
Yue et al., "An Interface Coassembly in Biliquid Phase: Toward Core-Shell Magnetic Mesoporous Silica Microspheres with Tunable Pore Size", J. Am. Chem. Soc., vol. 137, pp. 13282-13289 (2015).
Dong Hanjiang et al: "One-pot synthesis of silica core-shell particles with double shells and different pore orientations from their nonporous counterparts", Journal of Materials Chemistry, vol. 22, No. 26, Jan. 1, 2012 (Jan. 1, 2012), pp. 13197-13203.

* cited by examiner

SUPERFICIALLY POROUS PARTICLES AND METHODS FOR FORMING SUPERFICIALLY POROUS PARTICLES

RELATED APPLICATIONS

This application claims the benefit of and priority to U.S. Prov. App. No. 62/616,755, filed Jan. 12, 2018, which is hereby incorporated by reference in its entirety.

FIELD OF THE INVENTION

This application is directed to superficially porous particles and methods for forming superficially porous particles. More specifically, this application is directed to superficially porous particles and methods for forming superficially porous particles having layered structure with a predominately radial pore orientation and fiber-like skeleton with its thickness greater than 1 nm. Such a layered structure may change structural and physical characteristics between the layers. The superficially porous particles may be incorporated in separation devices, by way of example, as chromatographic stationary phase.

BACKGROUND OF THE INVENTION

Superficially porous particles comprise a nonporous core and porous shell. These particles have been widely used in various fields such as sensing, drug delivery, catalysis, and separation. For at least ten years, superficially porous particles with a narrow particle size distribution (less than 10% (one sigma) of the number average diameter) have been a significant driving force for the advancement of fast and efficient high performance liquid chromatography separation.

A number of routes have been used to prepare superficially porous particles with a narrow particle size distribution. The first strategy is the multilayer-by-multilayer (MLBML) process, which is described in U.S. Pat. Application Publication No. 2007/0189944, to Kirkland. In the MLBML process, large core particles are repeatedly deposited by alternating layers of oppositely charged nanoparticles and polyelectrolytes until the desired shell thicknesses are reached. The MLBML process is mature and the particles thus prepared have enjoyed a great commercial success in HPLC and UHPLC column development. Nevertheless, for practical chromatography application, approximately fifteen deposition cycles are required in MLBML and each deposition cycle involves multiple sequences (at least six) of centrifugation separation and water washing. As such, MLBML is a labor-intensive and time-consuming process.

The second commercially successful strategy is coacervation technology, which is described in U.S. Pat. No. 8,864,988, to Chen. In the coacervation method, large core particles are coated with a coacervation layer that is typically comprised of a polymer material and nanoparticles. A key advantage of the coacervation method compared to the MLBML process is that a thick porous shell may be obtained in one coating step. However, undesirable byproducts such as uncoated core particles, totally porous particles, and agglomerated particles may also form during this process. Additional steps, for example, liquid elutriation, may be required to remove these byproducts.

The third strategy is micelle-templated technique based on the Stöber process, which is described in WO 2010/061367, to Glennon. In this method, porous shells are formed on silica core particles through the hydrolysis and condensation of a silica precursor in the presence of surfactant(s) under basic conditions. Like the MLBML, process, the coating step in this modified Stöber process must be repeated many times in order to build a thick chromatographically functional shell. Furthermore, these particles do not contain chromatographically enhanced pore sizes, which must be expanded through additional steps such as hydrothermal treatment in an autoclave and base etching. Hydrothermal treatment makes scaling-up production difficult and etching leads to the final porous shell possessing only random pore structures. Therefore, these particles do not demonstrate any better separation efficiency compared to the commercial particles prepared by the MLBML process or the coacervation method.

The fourth strategy is micelle-templated pseudomorphism, which is described in U.S. Pat. No. 8,685,283, to Wei. In this method and in the presence of a surfactant and base under reflux conditions, core particles undergo pseudomorphic transformation that keeps the shape and size of core particles, but the core surface is etched and a porous shell is formed on the core surface. In contrast with previously described methods, where pores are randomly distributed with a broad pore size distribution, the micelle-templated pores have a narrow pore size distribution and ordered pore structure, and are substantially radially oriented and unconnected. The micelle-templated particles show higher chromatographic separation efficiency than their counterparts with a random pore structure. However, the micelle-templated method and the thus obtained superficially porous particles have several limitations. Specifically, the maximum pore size is approximately 8 nm (Wei, et al., J. Chromatogr. A, 1440 (2016) 55-65), which is in the low-end spectrum for even the smallest molecule separation. In addition, thick shells cannot be easily prepared by simply repeating the process without the formation of secondary particles and agglomerated particles. Further, the thickness of the fiber-like skeletons is only about 1 nm, which makes any treatments that involve etching impossible without destroying the fiber-like skeleton structures. Nevertheless, for certain applications, such as chromatography, etching is almost universally used, whether it is used for increasing the pore size or activating the surface functional group after enhancing the mechanical strength of the particles through sintering. As such, the excellent chromatographic efficiency of these particles due to their radially oriented pores is limited to the smallest molecule separation. In order to separate large molecules, U.S. Pat. Application Publication No. 2017/0282155, issued to Wei and Wang, discloses double shell particles with a porous inner shell having the same structure presented in U.S. Pat. No. 8,685,283 and a porous outer shell with a large conical shape pore. These unique particles show the advantage of separating both large and small molecules in a single run.

Micelle-templated synthesis of totally porous silica particles with thick fibrous morphologies is disclosed in U.S. Pat. Application No. 2011/0253643, to Polshettiwar. Silica particles are obtained through a microemulsion system typically composed of cetylpridinium bromide as a template, urea as a base catalyst, and tetraethoxysilane as a silica precursor in a cyclohexane-pentanol-water mixture under microwave-assisted hydrothermal conditions. In contrast with earlier micelle-templated techniques, including the previous mentioned third and fourth strategies where the thickness of silica skeletons is only about 1 nm, the Polshettiwar method generates silica particles that have a plurality of thick fiber-like skeletons that are radially orientated from the center to the exterior surface. The Polshettiwar strategy was further studied by other groups (Moon and Lee, Langmuir, 30 (2014) 15574-15580; Shen, et al., Nano Lett. 14 (2014) 923-932, and Qu, et al., Anal. Chem. 87 (2015) 9631-9638) under more facile and mild experimental conditions. In these publications, investigations were extended to prepare totally porous particles with multilayer generations and superficially porous particles with either metal, magnetic, or silica cores. In addition, the synthesis was conducted in a bi-phase system, which has a bottom aqueous phase and a top organic phase. However, the one-pot bi-phase method and superficially porous particles obtained therefrom have several limitations. Specifically, thick shells >300 nm, for example, cannot be easily obtained without the formation of secondary totally porous particles and aggregated particles. In addition, due to the likely low surface area and surface morphology of the core surface, pores close to the core surface up to 50 nm have a relative random and twisted pore orientation compared to those away from the core surface. This relatively high ratio of random and twisted pores has disadvantages for certain applications, for example, reducing chromatographic separation efficiency. Further, the porous shell has a very high pore volume, which is easily broken under UHPLC packing pressure. Overall, the superficially porous particles prepared by the bi-phase method have not demonstrated any better separation efficiency compared to the commercial particles prepared by the MLBML process or coacervation method (Qu, et al., Anal. Chem. 87 (2015) 9631-9638).

There is a need for superficially porous particles that have a high ratio of radially oriented pore structure and an adjustable pore size larger than 6 nm for high efficient separation of molecules with different sizes. In addition, there is a need for such particles to have a broad range of adjustable shell thickness while maintaining their uniform particle size distribution. Further, there is a need for such particles to have layered structure with changing structural and physical characteristics between layers. And finally, there is a need for such particles to be mechanically stable because such particles may be packed and used for chromatographic separations under very high packing or operation pressures, for example, in excess of 20 kpsi.

BRIEF DESCRIPTION OF THE INVENTION

In one exemplary embodiment, each of a plurality of superficially porous particles includes a solid core and a layered porous shell disposed on and radially outward of the solid core. The layered porous shell includes a porous inner layer and at least one porous outer layer disposed on and radially outward of the porous inner layer. The layered porous shell includes a first inorganic oxide. The porous inner layer includes an inner layer thickness of less than 300 nm. The at least one porous outer layer includes a cumulative outer layer thickness ranging from 1 to 100 times the inner layer thickness. The layered porous shell constitutes from 10 vol % to 90 vol % of the plurality of superficially porous particles. The at least one porous outer layer includes a predominately radial pore orientation. The at least one porous outer layer includes an outer layer pore structure which is more organized than an inner layer pore structure of the porous inner layer. The layered porous shell includes a fibrous shell skeleton having a shell skeleton thickness greater than 1 nm. The layered porous shell includes at least one structural or physical characteristic selected from the group consisting of layer thickness, skeleton thickness, pore orientation, pore size distribution, pore size, pore volume, surface area, and density which changes between the porous inner layer and the at least one porous outer layer.

In another exemplary embodiment, the layered porous shell includes a porous inner layer and a plurality of porous outer layers, each of the plurality of porous outer layers being distinct from one another across an interlayer boundary.

In another exemplary embodiment, a bi-phase layer-by-layer process for forming a plurality of superficially porous particles includes: (a) mixing an aqueous bottom phase and an organic top phase for a mixing duration to form a bi-phase mixture; (b) heating the bi-phase mixture under reflux conditions for a refluxing duration to form modified core particles; (c) cooling the bi-phase mixture to room temperature; (d) separating the plurality of modified core particles from the bi-phase mixture; and (e) repeating (a)-(d). The aqueous bottom phase includes a plurality of core particles (or modified core particles in (e)), a template, and a catalyst, and the organic top phase includes an organic solvent and a silane precursor.

In another exemplary embodiment, a post-modification process for forming superficially porous particles with chromatographically enhanced properties includes at least one of: removing a template by at least one of calcination and extraction; increasing pore size and eliminating small mesopores (<5 nm) by at least one of a hydrothermal method and etching; increasing a mechanical strength of the superficially porous particles by sintering; activating a plurality of functional surface groups by at least one of the hydrothermal method and etching; and functionalizing a plurality of surface groups of the plurality of superficially porous particles with organic silanes to form a plurality of functionalized surface groups.

1.81 µm particles; (d) the 1.81 µm particles of (c) at 50 times magnification, according to an embodiment of the present disclosure.

Figure 7:
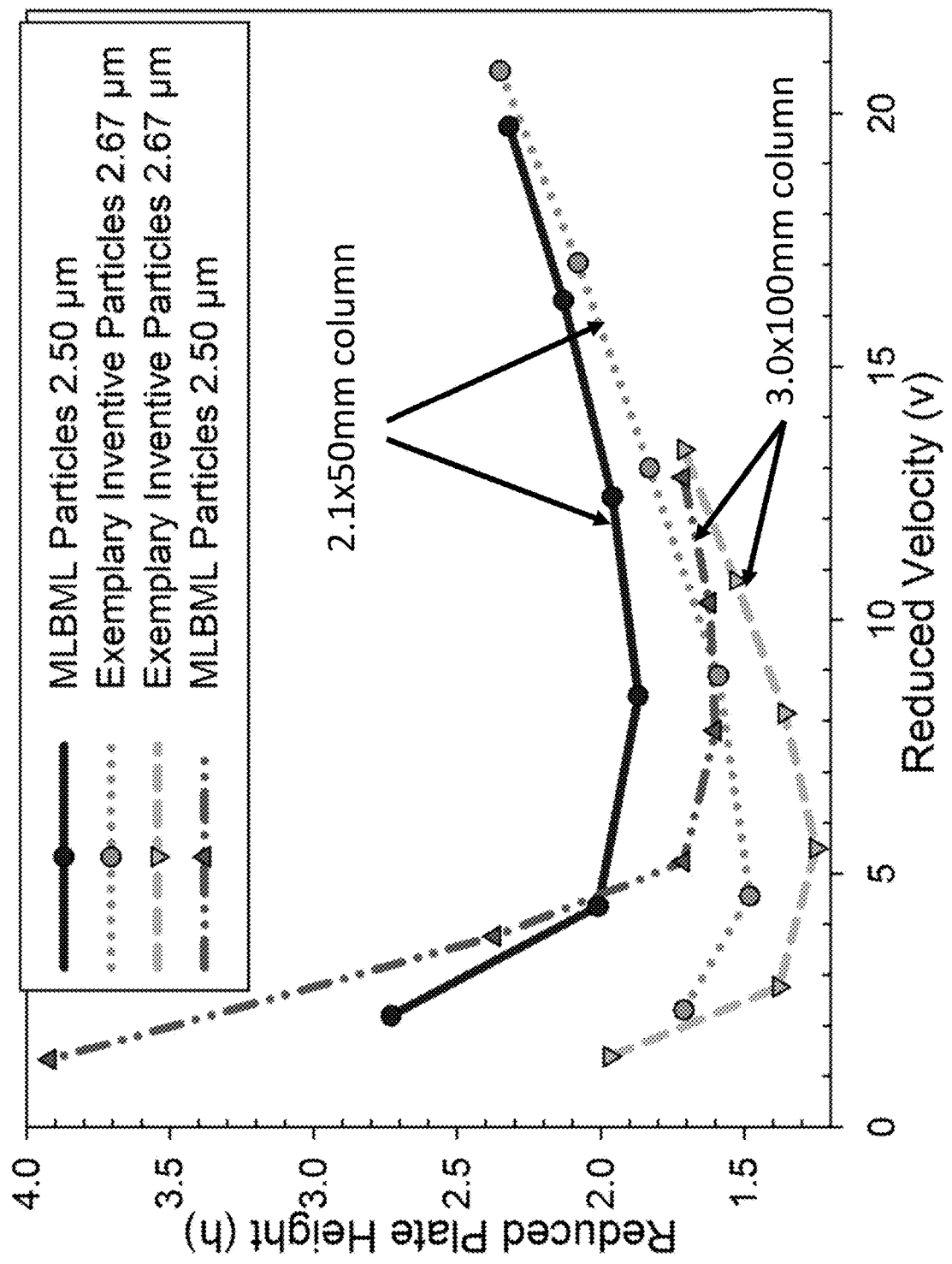

FIG. 7 is a comparison of reduced plate height (h) of biphenyl as a function of reduced interstitial velocity (v) for two types of columns (2.1×50 mm and 3.0×100 mm) packed with the superficially porous particles (2.67 µm) of the present disclosure or superficially porous particles prepared by MLBML.

Wherever possible, the same reference numbers will be used throughout the drawings to represent the same parts.

DETAILED DESCRIPTION OF THE INVENTION

Figure 1:
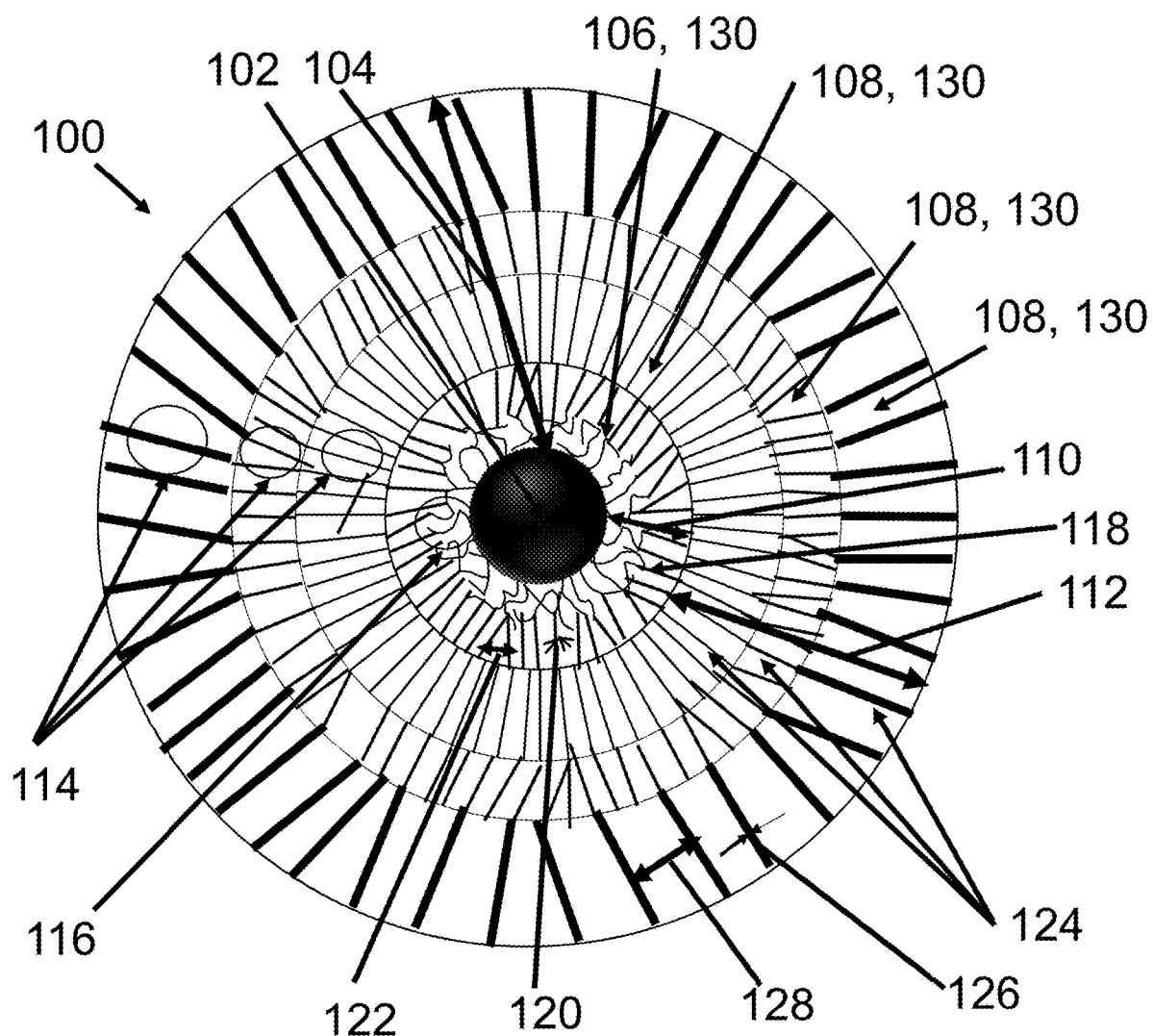
FIG. 1 is a schematic view of a superficially porous particle, according to an embodiment of the present disclosure.

Referring to FIG. 1, in one embodiment, for a plurality of superficially porous particles 100, each of the plurality of superficially porous particles 100 includes a solid core 102 and a layered porous shell 104 disposed on and radially outward of the solid core 102. The layered porous shell 104 includes a porous inner layer 106 and at least one porous outer layer 108 disposed on and radially outward of the porous inner layer 106 (porous outer layer 108 with three layers 130 shown in FIG. 1).

The solid core 102 may include any suitable material composition, including, but not limited to an inorganic oxide such as, but not limited to, silica. The layered porous shell 104 may include any suitable material composition, including, but not limited to an inorganic oxide such as, but not limited to, silica. The solid core 102 and the layered porous shell 104 may include the same inorganic oxide or may include distinct inorganic oxides.

The composition, uniformity, and shape of the solid core 102 is not believed to be of primary importance provided that the layered porous shell 104 may be deposited on its surface. However, for chromatographic separations, uniform, mechanically and thermally stable solid cores 102 are desirable as such solid cores 102 may be subjected to 30 kpsi packing pressure and 950° C. sintering temperature without significant failure of the solid cores 102.

In one embodiment, the core particles 102 are substantially non-porous with a specific surface area less than 10 m$^2$/g (based on nitrogen sorption analysis). The core particles may be substantially spherical with a median number diameter ranging from 0.2 µm to 50 µm, alternatively from 0.5 µm to 20 µm, alternatively from 1 µm to 10 µm, alternatively from 1 µm to 3.5 µm. The core particles may have a very narrow particle size distribution, such as, but not limited to, 20%, alternatively 10%, alternatively 5%, or less of the average number particle size. Particle diameters and their distributions may be measured by the Beckman Coulter Counter technique.

In one embodiment, the plurality of superficially porous particles 100 includes an average (number) size from 0.5 µm to 100 µm, alternatively from 0.5 µm to 50 µm, alternatively from 25 µm to 75 µm, alternatively from 50 µm to 100 µm, alternatively from 0.5 µm to 20 µm, alternatively from 10 µm to 30 µm, alternatively from 20 µm to 40 µm, alternatively from 30 µm to 50 µm, alternatively from 40 µm to 60 µm, alternatively from 50 µm to 70 µm, alternatively from 60 µm to 80 µm, alternatively from 70 µm to 90 µm, alternatively from 80 µm to 100 µm, alternatively from 0.5 µm to 10 µm, alternatively from 5 µm to 15 µm, alternatively from 10 µm to 100 µm.

In one embodiment, the plurality of superficially porous particles 100 includes a particle size distribution of less than 20% of the number average size of the plurality of superficially porous particles 100, alternatively less than 10%, alternatively less than 5%, alternatively less than 2%.

In one embodiment, the plurality of superficially porous particles 100 includes a specific surface area ranging from 10 m$^2$/g to 800 m$^2$/g, alternatively from 10 m$^2$/g to 500 m$^2$/g, alternatively from 400 m$^2$/g to 800 m$^2$/g, alternatively from 25 m$^2$/g to 500 m2/g, alternatively from 300 m$^2$/g to 800 m$^2$/g, alternatively from 10 m$^2$/g to 100 m2/g, alternatively from 50 m$^2$/g to 150 m$^2$/g, alternatively from 100 m$^2$/g to 200 m$^2$/g, alternatively from 150 m$^2$/g to 250 m$^2$/g, alternatively from 200 m$^2$/g to 300 m$^2$/g, alternatively from 250 m$^2$/g to 350 m$^2$/g, alternatively from 300 m$^2$/g to 400 m$^2$/g, alternatively from 350 m$^2$/g to 450 m$^2$/g, alternatively from 400 m$^2$/g to 500 m$^2$/g, alternatively from 450 m$^2$/g to 550 m$^2$/g, alternatively from 500 m$^2$/g to 600 m$^2$/g, alternatively from 550 m$^2$/g to 650 m$^2$/g, alternatively from 600 m$^2$/g to 700 m$^2$/g, alternatively from 650 m$^2$/g to 750 m$^2$/g, alternatively from 700 m$^2$/g to 800 m$^2$/g.

In one embodiment, the superficially porous particles 100 may have a specific pore volume ranging from 0.05 cm$^3$/g to 2 cm$^3$/g, alternatively from 0.1 cm$^3$/g to 1.5 cm$^3$/g, alternatively from 0.1 cm$^3$/g to 1 cm$^3$/g, and may have a density ranging from 0.2 g/cm$^3$ to 2.0 g/cm$^3$, alternatively from 0.5 g/cm$^3$ to 1.8 g/cm$^3$, alternatively from 0.75 g/cm$^3$ to 1.5 g/cm$^3$.

In one embodiment, layered porous shell 104 includes a fibrous shell skeleton having a shell skeleton thickness greater than 1 nm, alternatively greater than 1.5 nm, alternatively greater than 2 nm, alternatively greater than 2.5 nm, alternatively from 1 nm to 10 nm, alternatively from 1 nm to 20 nm, alternatively from 1 nm to 10 nm, alternatively from 5 nm to 15 nm, alternatively from 10 nm to 20 nm.

The layered porous shell 104 includes at least one structural or physical characteristic selected from the group consisting of layer thickness, skeleton thickness, pore orientation, pore size distribution, pore size, pore volume, surface area, and density which changes between the porous inner layer 106 and the at least one porous outer layer 108.

In one embodiment, the porous inner layer 106 includes a predominately random pore orientation close to the core surface, and the pores are unconnected. The porous inner layer 106 may include any suitable inner layer thickness 110, including, but not limited to, an inner layer thickness 110 of less than 300 nm.

In one embodiment, the at least one porous outer layer 108 may consist of a single layer 130 or may include a plurality of layers 130, including, but not limited to, at least 1 layer 130, alternatively at least 2 layers 130, alternatively at least 3 layers 130, alternatively at least 4 layers 130, alternatively at least 5 layers 130, alternatively at least 10 layers 130, alternatively between 1 to 30 layers 130, alternatively between 2 to 50 layers 130, alternatively between 2 to 30 layers 130.

The plurality of layers 130 of the at least one porous outer layer 108 may vary amongst the layers 130 with respect to layer thickness, skeleton thickness, pore orientation, porosity, which includes pore size, pore volume, and surface area, or combinations thereof, or the layers 130 may include the same layer thickness, skeleton thickness, pore orientation, and porosity, which includes pore size, pore volume, and surface area, or combinations thereof.

In one embodiment, the at least one porous outer layer 108 may include a cumulative outer layer thickness 112 from 1 to 100 times the inner layer thickness 110, alternatively from 1 to 50 times the inner layer thickness 110, alternatively from 25 to 75 times the inner layer thickness 110, alternatively from 50 to 100 times the inner layer thickness 112, alternatively from 2 to 50 times the inner layer thickness 110, alternatively from 1 to 20 times the inner layer thickness 110, alternatively from 10 to 30 times the inner layer thickness 110, alternatively from 20 to 40 times the inner layer thickness 110, alternatively from 30 to 50 times the inner layer thickness 110, alternatively from 40 to 60 times the inner layer thickness 110, alternatively from 50 to 70 times the inner layer thickness 110, alternatively from 60 to 80 times the inner layer thickness 110, alternatively from 70 to 90 times the inner layer thickness 110, alternatively from 80 to 100 times the inner layer thickness 110.

In one embodiment, the porous shell 104 includes a thickness is in the range of from 20 nm to 1,000 nm, alternatively from 50 nm to 500 nm, alternatively from 100 nm to 350 nm.

In one embodiment, the at least one porous outer layer 108 includes a predominantly radial pore orientation. Adjacent layers 130 of the at least one porous outer layer 108 may have the same or different pore orientation.

In one embodiment, the at least one porous outer layer 108 includes an outer layer pore structure 114 which is more organized than an inner layer pore structure 116 of the porous inner layer 106, with the pores in the at least one porous outer layer 108 being predominately unconnected.

In one embodiment, the porous inner layer 106 includes a fibrous inner layer skeleton 118 having an inner layer skeleton thickness 120 greater than 1 nm, alternatively greater than 1.5 nm, alternatively greater than 2 nm, alternatively greater than 2.5 nm, alternatively from 1 nm to 10 nm, alternatively from 1 nm to 20 nm, alternatively from 1 nm to 10 nm, alternatively from 5 nm to 15 nm, alternatively from 10 nm to 20 nm.

In one embodiment, the porous inner layer 106 includes an inner layer average pore size 122 from 4 nm to 100 nm, alternatively from 4 nm to 50 nm, alternatively from 25 nm to 75 nm, alternatively from 50 nm to 100 nm, alternatively from 6 nm to 50 nm, alternatively from 4 nm to 20 nm, alternatively from 10 nm to 30 nm, alternatively from 20 nm to 40 nm, alternatively from 30 nm to 50 nm, alternatively from 40 nm to 60 nm, alternatively from 50 nm to 70 nm, alternatively from 60 nm to 80 nm, alternatively from 70 nm to 90 nm, alternatively from 80 nm to 100 nm.

In one embodiment, the at least one porous outer layer 108 includes a fibrous outer layer skeleton 124 having an outer layer skeleton thickness 126 greater than 1 nm, alternatively greater than 1.5 nm, alternatively greater than 2 nm, alternatively greater than 2.5 nm, alternatively from 1 nm to 10 nm, alternatively from 1 nm to 20 nm, alternatively from 1 nm to 10 nm, alternatively from 5 nm to 15 nm, alternatively from 10 nm to 20 nm.

In one embodiment, the porous outer layer 108 includes an outer layer average pore size 128 from 4 nm to 100 nm, alternatively from 4 nm to 50 nm, alternatively from 25 nm to 75 nm, alternatively from 50 nm to 100 nm, alternatively from 6 nm to 50 nm, alternatively from 4 nm to 20 nm, alternatively from 10 nm to 30 nm, alternatively from 20 nm to 40 nm, alternatively from 30 nm to 50 nm, alternatively from 40 nm to 60 nm, alternatively from 50 nm to 70 nm, alternatively from 60 nm to 80 nm, alternatively from 70 nm to 90 nm, alternatively from 80 nm to 100 nm.

In one embodiment, specifically for chromatographic applications, the shell average pore size 122, 128 ranges from 6 nm to 15 nm for small molecule separations (<1000 Da), from 15 nm to 25 nm for medium size molecule separations (between 1000 Da to 10 kDa), and from 25 nm to 100 nm for large molecule separations (>10 kDa).

In one embodiment, the inner layer skeleton thickness 120 is the same as the outer layer skeleton thickness 126. In another embodiment, the inner layer skeleton thickness 120 is distinct from the outer layer skeleton thickness 126.

In one embodiment, the inner layer average pore size 122 is the same as the outer layer average pore size 128. In one embodiment, the inner layer average pore size 122 is distinct from the outer layer average pore size 128.

In one embodiment, the layered porous shell 104 constitutes from 10 vol % to 90 vol % of the plurality of superficially porous particles 100, alternatively from 10 vol % to 60 vol %, alternatively from 20 vol % to 70 vol %, alternatively from 25 vol % to 75 vol %, alternatively from 30 vol % to 80 vol %, alternatively from 40 vol % to 90 vol %, alternatively from 10 vol % to 50 vol %, alternatively from 30 vol % to 70 vol %, alternatively from 50 vol % to 90 vol %, alternatively from 10 vol % to 30 vol %, alternatively from 20 vol % to 40 vol %, alternatively from 30 vol % to 50 vol %, alternatively from 40 vol % to 60 vol %, alternatively from 50 vol % to 70 vol %, alternatively from 60 vol % to 80 vol %, alternatively from 70 vol % to 90 vol %.

In one embodiment, a process of making superficially porous particles 100 includes a bi-phase layer-by-layer ("LBL") process.

In one embodiment, the bi-phase LBL process includes: (a) mixing an aqueous bottom phase and an organic top phase for a mixing duration to form a bi-phase mixture; (b) heating the bi-phase mixture under reflux conditions for a refluxing duration to form modified core particles; (c) cooling the bi-phase mixture to room temperature; (d) separating the plurality of modified core particles from the bi-phase mixture; and (e) repeating (a)-(d). The aqueous bottom phase includes a plurality of core particles (or modified core particles in (e)), a template, a catalyst, and, optionally, a co-solvent, and the organic top phase includes an organic solvent, a silane precursor, and, optionally, a co-solvent. Performing (a)-(d) initially disposes a porous inner layer 106 on and radially outward of solid cores 102 formed from the plurality of core particles. Repeating (a)-(d) forms porous outer layers 108 disposed on and radially outward of the porous inner layers 106 until a predetermined cumulative outer layer thickness 112 is formed. Each repetition of (a)-(d) forms a layer 130 of the porous outer layers 108.

In one embodiment, separating the plurality of modified core particles from the bi-phase mixture may include any suitable separation method, such as, but not limited to, centrifugation, filtration, or combinations thereof. Without being bound by theory, it is believed that separating the plurality of modified core particles from the bi-phase mixture before depositing additional layers 130 may avoid the formation of undesirable byproducts such as secondary nucleated totally porous particles and agglomerated particles.

The LBL process is developed to make superficially porous particles 100 with layered structure that has an adjustable thick shell that cannot prepared by the one-pot bi-phase method. In addition, as previously noted, the superficially porous particles 100 obtained by the one-pot bi-phase method do not show better chromatographic separation efficiency than their counterparts with a random pore orientation. Without being bound by theory, this may be due to the substantial ratio of randomly oriented pores close to the core surface, likely resulting from the low surface area and different surface morphology of core particles compared to the modified core particles. As such, superficially porous particles 100 with layered structure in which the outer porous layers 108 have a predominately radial pore orientation may increase the ratio of radially oriented pores that lead to a better separation efficiency. Equally important, it is with this layered structure that one has a great flexibility to design particles with different structural, physical, mechanical, thermal, chemical properties in the plurality of layers 130 for different applications.

In one embodiment, unlike the MLBML process, which requires two steps (polyelectrolyte coating and nanoparticle coating) in each coating cycle and multiple washing times in each step to remove excess polyelectrolytes or nanoparticles, each coating (layer 130) cycle in the bi-phase LBL process described herein involves only one centrifugation step and no further washing is necessary. In addition, the thickness of a MLBML based layer 130 is often less than 50 nm while that of a bi-phase LBL process layer 130 may exceed 100 nm. As such, and by way of example, to obtain a 500 nm shell, may be accomplished with 5 layers 130 in LBL instead of more than 10 layers 130 in the MLBML process. Thus, the bi-phase LBL based process is a significantly faster process than the MLBML approach, significantly reducing the labor cost and improving the manufacturing efficiency.

The plurality of core particles may include any suitable material composition, including, but not limited to silica. An example of silica core particle preparation is disclosed in U.S. Pat. No. 4,775,520, incorporated herein its entirety by reference.

The template may include, but is not limited to surfactants, such as, but not limited to compounds of the formula $C_nH_{2n}(CH_3)_3N^+X^-$, where n is an integer from 10 to 20, and X is either chloride or bromide. In one embodiment, the template is cetyltrimethylammonium bromide.

The catalyst may include any suitable compound, such as, but not limited to, urea, amino acids, quaternary ammonium hydroxides, organic amines, ammonium hydroxide, metal hydroxides such as sodium hydroxide and potassium hydroxide, and ionic fluorides such as sodium fluoride, potassium fluoride, ammonium fluoride, and ammonium hydrogen difluoride, or combinations thereof. In one embodiment, the catalyst is urea.

Suitable organic solvents include those which are immiscible with water and miscible with silanes, such as, but not limited to, cycloalkanes of the formula $C_nH_{2n}$, alkanes of the formula $C_nH_{2n+2}$, where n is an integer of 5-20, vegetable oil, hexane, cyclohexane, benzene, toluene, xylene, or combinations thereof. In one embodiment, the organic solvent is cyclohexane.

Silane precursors include, but are not limited to, metal alkoxides such as tetramethoxysilane, tetraethyl orthosilicate ("TEOS"), tetrapropoxysilane, tetrabutoxysilane, or combinations thereof. In one embodiment, the silane precursor is TEOS.

In one embodiment, neither the aqueous bottom phase nor the organic top phase includes a co-solvent. In another embodiment, the aqueous bottom phase includes a co-solvent and the organic top phase is free of co-solvent. In an alternative embodiment, the aqueous bottom phase is free of co-solvent and the organic top phase includes a co-solvent. In yet another embodiment, the aqueous bottom phase and the organic top phase include a co-solvent. The co-solvent may include any suitable solvent, including but not limited to, an alcohol of the formula $C_nH_{2n+1}OH$, where n is an integer of 3-10, such as, but not limited to isopropanol, butanol, pentanol, or combinations thereof.

Without being bound by theory, it is believed that, under gentle stirring and reflux conditions, multiple steps may occur separately or simultaneously to form a porous layer 130 on the core particles or superficially porous particles 100. These steps include but are not limited to: hydrolyzing the silane precursor at the aqueous-organic (oil) interface, diffusing hydrolyzed species into the aqueous phase, condensing hydrolyzed species into silicate oligomers, assembling silicate oligomers with surfactant micelles, and forming micelle-templated porous silica layer 130 on the silica core or superficially porous particles.

The volume ratio of the organic solvent versus water may range from 0.25 to 1.75, alternatively from 0.9 to 1.1. The weight ratio of core particle (or superficially porous particles 100) versus water may range from 0.02 to 0.30, alternatively from 0.05 to 0.10. The weight ratio of the catalyst (such as, but not limited to, urea) versus water may range from 0.001 to 0.10, alternatively from 0.005 to 0.05. The weight ratio of the surfactant (such as, but not limited to, cetyltrimethylammonium bromide) versus water may range from 0.005 to 0.10, alternatively from about 0.005 to about 0.05. The weight ratio of the co-solvent versus water, which may be either in the aqueous phase or the organic solvent phase or both, may range from 0.001 to 0.10, alternatively from 0.005 to 0.05. The weight ratio of the core particles (or superficially porous particles 100) versus the silane precursor may range from 0.25 to 3.0, alternatively from 0.75 to 1.25.

Various reaction conditions such as temperature, stirring rate, pH, and reaction time (reflux duration) may be applied to control the properties of the porous shells.

The upper limit of the reaction temperature may depend on the boiling point of water or the organic solvent, whichever is lower. The temperature may affect the porosity of the porous layer 130, in particular the pore size and the pore size distribution. In one embodiment, the reaction temperature for reaction with the organic solvent cyclohexane ranges from 40° C. to 80° C., alternatively from 65° C. to 75° C. The stirring rate may significantly impact the porosity of the porous layer 130, in particular the pore size. In an embodiment with 1,250 mL bi-phase mixture in a 2,000 mL flask with a 5 cm mechanical stir bar, the stirring rate may range from 50 rpm/min to 2,000 rpm/min, alternatively from 150 rpm/min to 800 rpm/min. The refluxing duration impacts the thickness of the porous layer 130. In typical conditions, the refluxing duration may range from 5 hours to 5 days, alternatively from 12 hours to 36 hours. The pH value of the bi-phase mixture affects the rate of hydrolysis and condensation of the silane precursor and thus the growth rate of the layer thickness. The pH values may range from 7.0 to 11.5, alternatively 9.0 to 11.0. The rate of hydrolysis and condensation of the silane precursor in this pH range may be directly proportional to the pH value.

In one embodiment, as previously pointed out, the randomly oriented pores close to the core surface may have disadvantages for certain applications such as chromatographic separations. As such, it is desirable to limit the inner layer thickness with such a random pore structure 116 less than 50 nm, alternatively less than 20 nm, alternatively less than 10 nm in order to improve the chromatographic separation efficiency. There are multiple strategies to achieve this goal, for examples, reducing weight ratio of the silane precursor to silica core particles from a typical value of 1 to less than 0.5, reducing the reaction temperature from a typical value of 70° C. to 60° C., and reducing the reaction time of a typical value of 24 hours to 5 hours.

The term "chromatographically enhanced properties" refers to, but is not limited to, superficially porous particles 100 with adequate pore size, surface area, surface functionality, mechanical rigidity for chromatographic applications.

In one embodiment, a post-modification process for forming superficially porous particles 100 with chromatographically enhanced properties includes at least one of the following post-modification steps: (a) removing the template by at least one of calcination and extraction; (b) increasing the pore size and eliminating small mesopores (<5 nm) by at least one of hydrothermal and etching; (c) increasing the mechanical strength of the plurality of superficially porous particles 100 by sintering; (d) activating a plurality of functional surface groups of the plurality of superficially porous particles 100 by at least one of hydrothermal method and etching; and (e) functionalizing a plurality of surface groups of the plurality of superficially porous particles 100 with organic silanes to form a plurality of functionalized surface groups.

An example of removing the template by extraction may be found in J. Am. Chem. Soc., 137 (2015), 13282-13289, incorporated herein in its entirety by reference. An example of a hydrothermal method to increase pore size may be found in WO 2010/061367, incorporated herein in its entirety by reference. An example of etching that is effective to change the porosity of silica particles may be found in European Pat. EP0272904A2, incorporated herein in its entirety by reference. An example of sintering and rehydroxylation of silica particles is disclosed U.S. Pat. No. 4,874,518, incorporated herein in its entirety by reference. Experimental details of steps (a)-(d) are provided in the illusive examples.

In one embodiment, the plurality of superficially porous particles 100 further include a plurality of functionalized surface groups. Suitable functionalized surface groups include, but are not limited to, alkyl groups, alkynl groups, aryl groups, diol groups, amino groups, alcohol groups, amide groups, cyno groups, ether groups, nitro groups, carbonyl groups, epoxide groups, sulfonyl groups, cation exchanger groups, anion exchanger groups, carbamate groups, urea groups, or combinations thereof.

The plurality of superficially porous particles 100 may be applied to any suitable process or product, including, but not limited to, being a chromatographic stationary phase. In one embodiment, a separation device such as, but not limited to a packed column for chromatographic applications may incorporate the plurality of superficially porous particles 100 as the stationary phase or as a portion of the stationary phase, and may provide advantages for separation due to broad ranges of pore sizes and shell thickness, radially oriented pores, and high mechanical strength. Slurry packing, which is also well documented in the literature, may be used to pack the particles into the chromatographic HPLC/UHPLC columns. The general guidelines for packing columns may be found in a recent publication (Wahab et al., Anal. Chem. 89 (2017), 8177-8191), incorporated herein in its entirety by reference.

Transmission electron microscopy may be used to characterize particle size, shell thickness, skeleton thickness, and pore size orientation of superficially porous particles 100. Scanning electron microscopy may be used to characterize particle size and surface morphology of superficially porous particles 100. Nitrogen sorption porosimetry may be sued to characterize porosity (including surface area, pore size, pore size distribution, and pore volume) of superficially porous particles 100. Coulter counter may be used to characterize particles size, particle size distribution, and shell thickness of superficially porous particles 100. High performance liquid chromatography may be used to characterize separation efficiency of superficially porous particles 100. Properties of four exemplary superficially porous particles 100 differentiated by particle sizes and characterized by at least one of the aforementioned techniques are illustrated in the following figures and examples. Exemplary superficially porous particles 100 include: 2.67 μm prepared by Example 1; 1.81 μm prepared by Example 2; 2.75 μm prepared by Example 3; and 1.60 μm prepared by Example 4. Particle sizes measured by different techniques may be slightly different.

Figure 2:
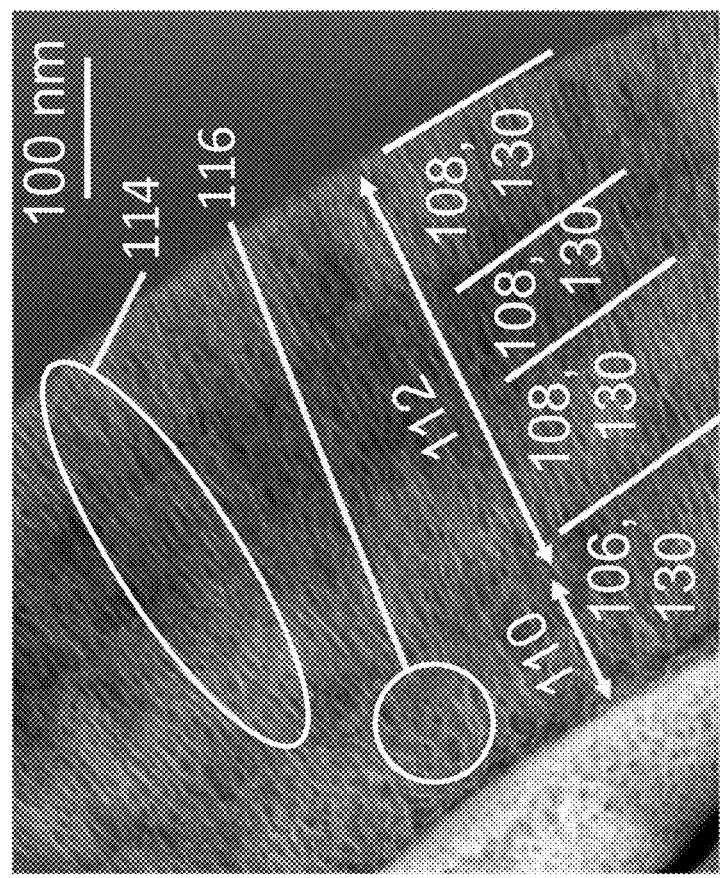
FIG. 2(a) is transmission electron microscopy sectioning images of superficially porous particles (2.67 µm), according to an embodiment of the present disclosure.
FIG. 2(b) is transmission electron microscopy sectioning images of one of the superficially porous particles of FIG. 2(a) at 10 times the magnification, according to an embodiment of the present disclosure.
Figure 2:
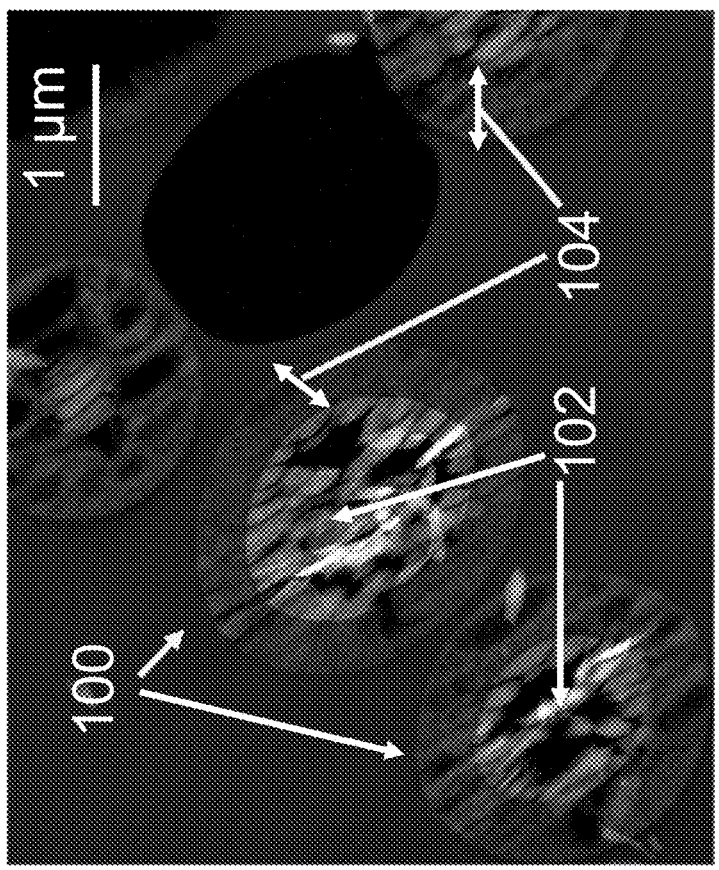

Referring to FIG. 2, transmission electron microscopy ("TEM") sectioning images of superficially porous particles 100 (2.67 μm particles) illustrates the structure of the superficially porous particle 100 at a first magnification (a) and then again at 10 times of that magnification (b). From these TEM images, one may observe that the thickness 110 of the porous inner layer 106 is approximately 100 nm while the cumulative thickness 112 of the at least one porous outer layer 108 is approximately 300 nm. In addition, the porous inner layer 106 has a relatively less organized inner layer pore structure 116 in comparison to the outer layer pore structure 114 and those close to the solid core 102 may have a random pore orientation. Further, the at least one porous outer layer 108 has more organized pores with a substantially radial pore orientation. The pores throughout the layered porous shell 104, however, are substantially unconnected regardless of their orientations. Furthermore, the pores in different layers 130 of the at least one porous outer layer 108 may have slightly different orientations. Additionally, the thickness of fibrous skeletons after two etching steps (pore size modification and rehydroxylation) is still larger than 1 nm, a number that is usually reported in the micelle-templated superficially porous particles that cannot undergo any etching process without destroying their radial pore orientation. The preservation of the radial pore orientation may be beneficial for certain applications, for example, chromatographic separation.

Figure 3:
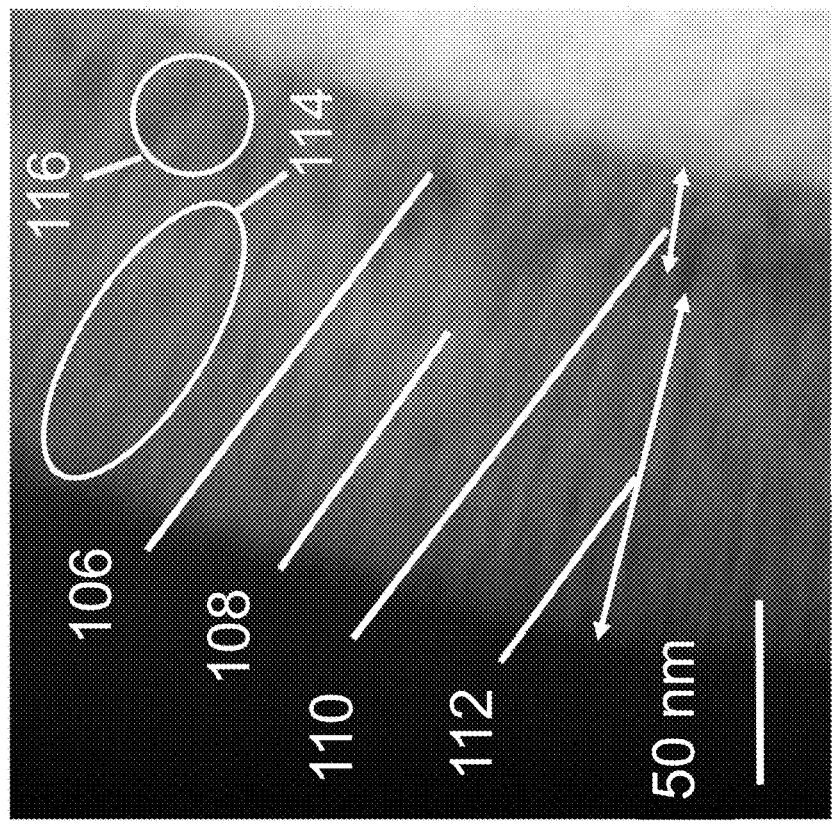
FIG. 3(a) is transmission electron microscopy sectioning images of another superficially porous particle (1.60 µm), according to an embodiment of the present disclosure.
FIG. 3(b) is transmission electron microscopy sectioning images of another superficially porous particle of FIG. 3(a) at 8 times the magnification, according to an embodiment of the present disclosure.
Figure 3:
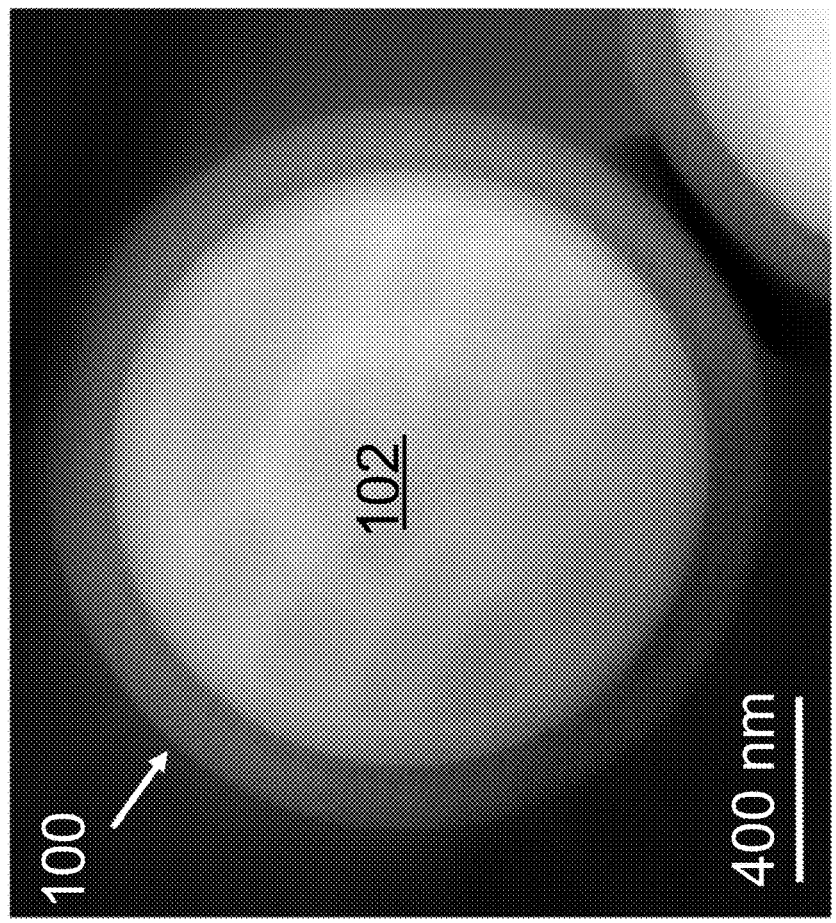

Referring to FIG. 3, TEM images of a superficially porous particle 100 (1.60 μm particles) illustrate the structure of the superficially porous particle 100 at a first magnification (a) and then again at 8 times of that magnification (b). From these TEM images, one may observe that the diameters of the imaged solid cores 102 and superficially porous particles 100 are approximately 1.30 μm and 1.58 μm, respectively. The thickness 110 of the porous inner layer 106 is approximately 30 nm while the cumulative thickness 112 of the porous outer layer 108 is approximately 120 nm. In addition, the porous inner layer 106 has a relatively less organized inner layer pore structure 116 in comparison to the outer layer pore structure 114. Further, the porous outer layer 108 has more organized pores with a substantially radial pore orientation. In this particular embodiment, the thickness of the inner porous layer is reduced to 30 nm by reducing the weight ratio of TEOS to silica cores from a typical value of 1-1.5 to 0.6 and the reflux duration from a typical value of 24 hours to 5 hours.

Figure 4:
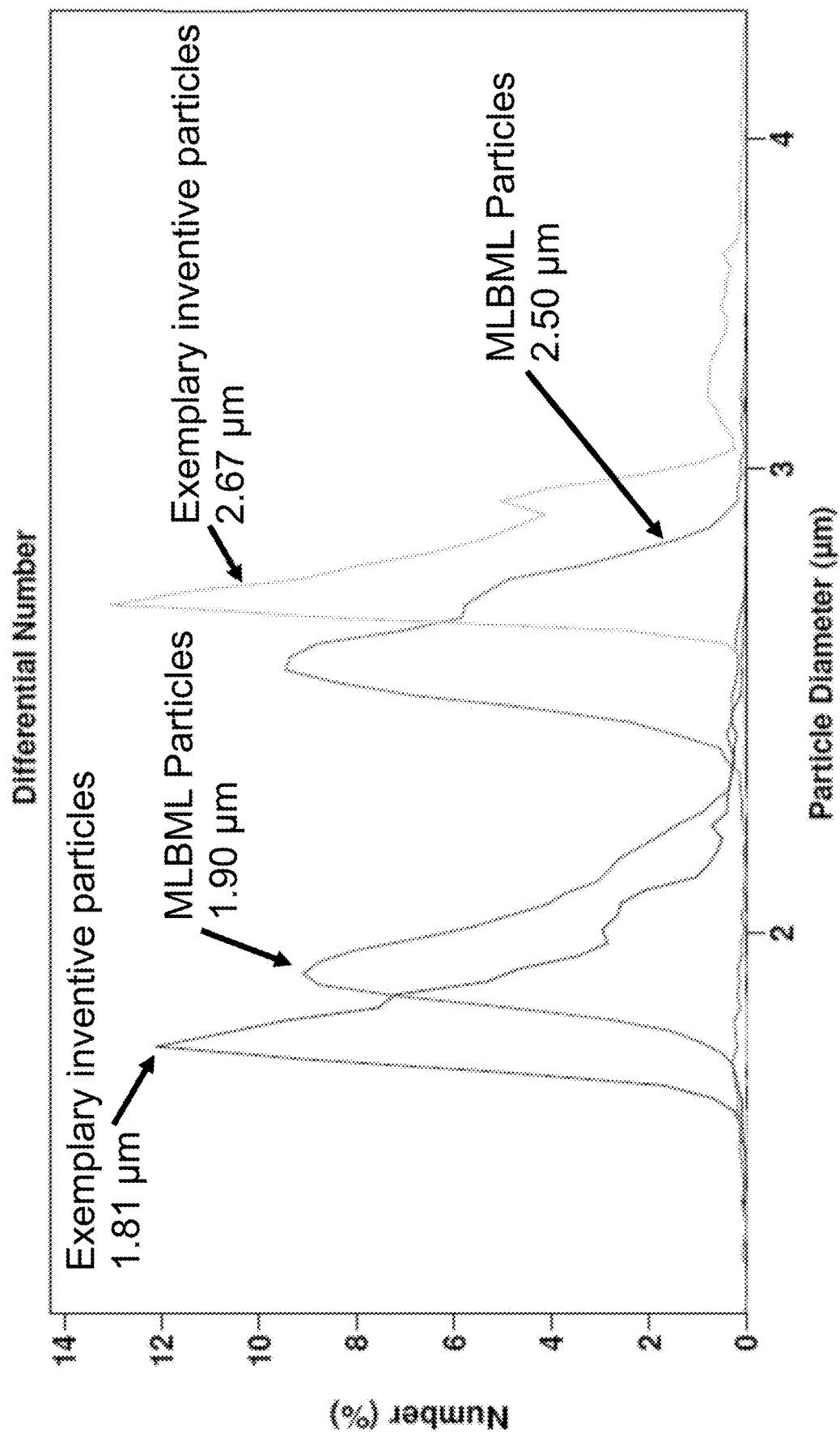
FIG. 4 is a comparison of particle size distribution of superficially porous particles (2.67 µm and 1.81 µm) of the present disclosure in comparison with superficially porous particles prepared by MLBML.

Referring to FIG. 4, a comparison of particle size distribution of the superficially porous particles 100 in accordance with the present disclosure (2.67 μm particles and 1.81 μm particles) to counterparts prepared by the MLBML process (2.50 μm and 1.90 μm) is presented. Based on FIG. 4, it is possible to prepare the superficially porous particles 100 by the present process that includes the bi-phase LBL process and multiple post-modification steps with a relatively narrow particle size distribution compared to those prepared by the MLBML process. Without being bound by theory, it is believed that a narrow particle size distribution of commercial superficially porous particles compared to totally porous particles that have a broad particle size distribution is likely a primary reason that the former has a superior chromatographic separation efficiency.

Figure 5:
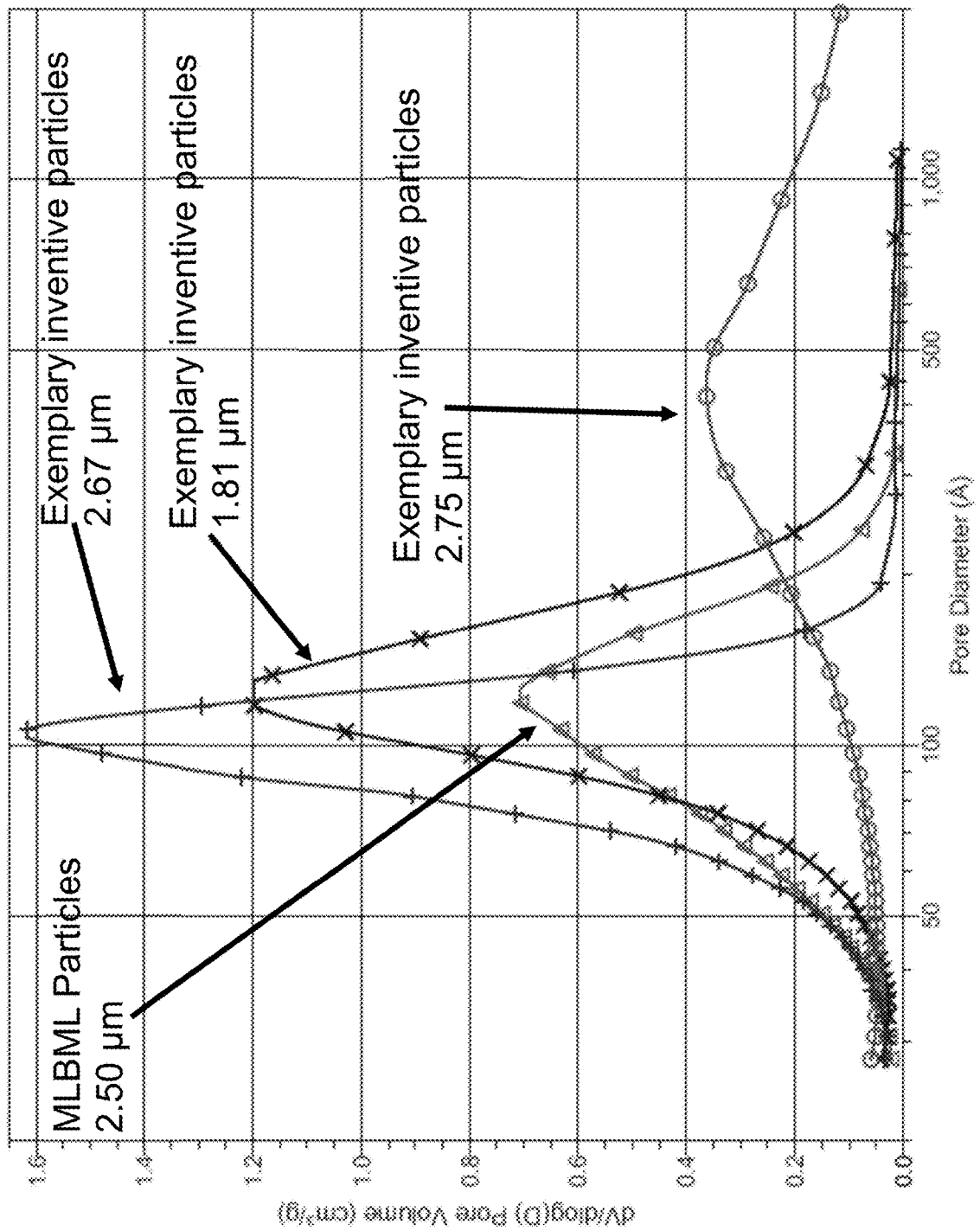
FIG. 5 is a comparison of pore size distribution (Barrett, Joyner and Halenda—"BJH") of superficially porous particles (2.67 µm, 1.81 µm, and 2.75 µm) of the present disclosure in comparison with superficially porous particles prepared by MLBML.

Referring to FIG. 5, the BJH adsorption pore size distributions of superficially porous particles 100 (2.67 μm particles, 1.81 μm particles, and 2.75 μm particles) in accordance with the present disclosure and those prepared by the MLBML process are compared. The average pore sizes of these particles are approximately 10 nm (2.67 μm particles), 15 nm (1.81 μm particles), and 25 nm (2.75 μm particles). As shown by these measurements, and for the approximately 10 nm size pores, it is possible to prepare the superficially porous particles 100 by the present bi-phase LBL process with a relatively narrow pore size distribution compared to those prepared by the MLBML process. FIG. 5 also demonstrates that superficially porous particles 100 with a broad range of pore sizes may be prepared by the present bi-phase LBL process.

Figure 6:
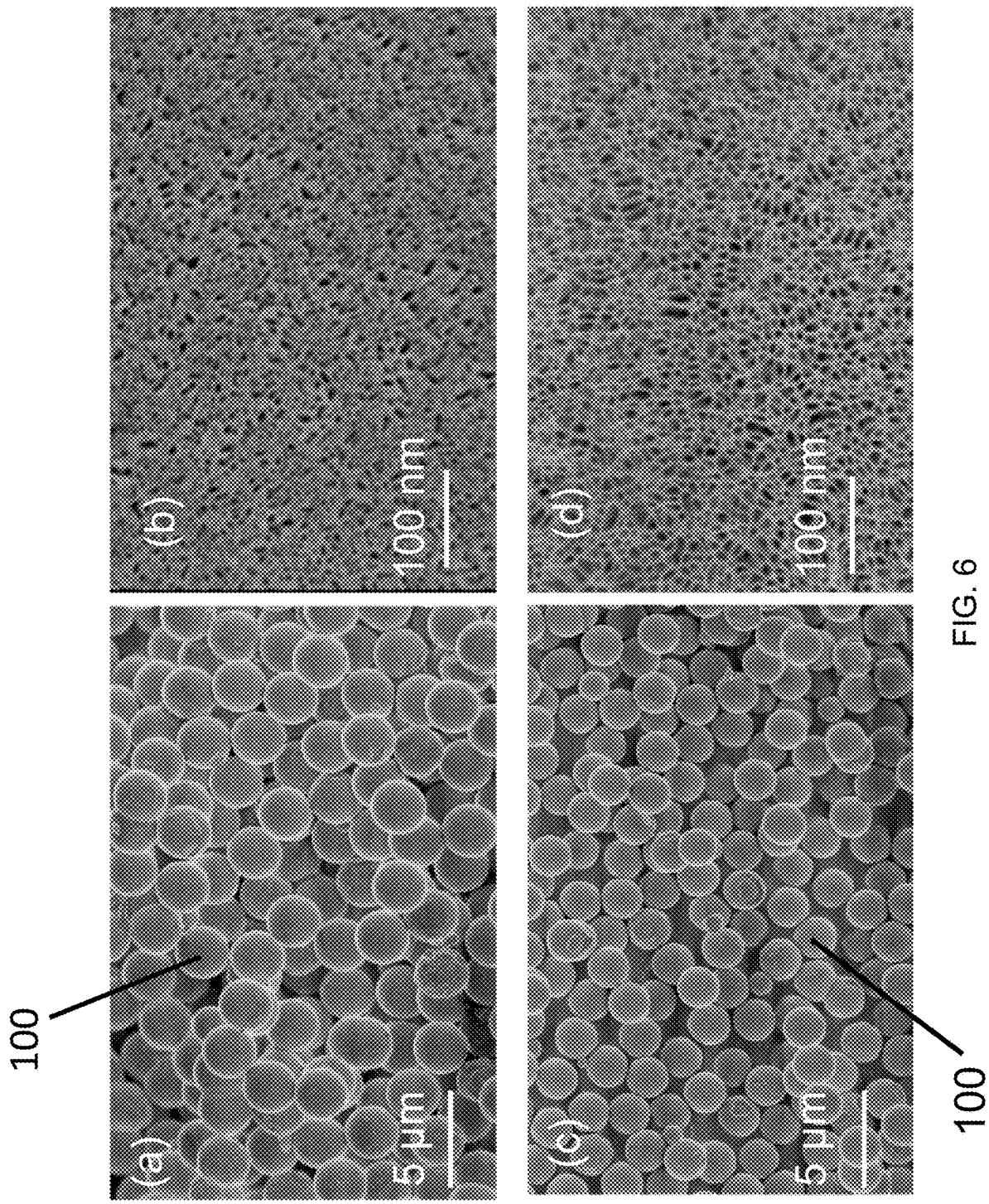
FIG. 6 are scanning electron microscopy images of the superficially porous particle of FIG. 4: (a) 2.67 µm particles; (b) the 2.67 µm particles of (a) at 50 times magnification; (c)

Referring to FIG. 6, scanning electron microscopy images of the superficially porous particle 100 of FIG. 4: (a) 2.67 μm particles; (b) the 2.67 μm particles of (a) at 50 times magnification; (c) 1.81 μm particles; (d) the 1.81 μm particles of (c) at 50 times magnification, are presented. As shown by these images, the superficially porous particle 100 prepared by the present process which includes the bi-phase LBL process and multiple post-modification steps may have a smooth surface morphology. A rough external particle surface may limit the performance of columns packed with such particles by generating an unusually high film mass transfer resistance at high flow rates (Gritti, et al., J. Chromatogr. A, 1166 (2007) 30-46). Further, it is clear that the 1.81 μm superficially porous particles 100 of FIG. 4(d) have relatively large pore sizes in comparison with the 2.67 μm superficially porous particles 100 of FIG. 4(b)

Referring to FIG. 7, the performance of packed HPLC columns with superficially porous particles 100 (2.67 μm particles) is evaluated by reduced plate height value in a van Deemter plot. In general, the smaller the reduced plate height, the more efficient the packed HPLC column. Comparisons are presented of the results of columns (2.1 mm ID×50 mm length and 3.0 mm ID×100 mm length) packed with superficially porous particles 100 of the present disclosure and conventional MLBML counterparts. The experiments were run in 55% acetonitrile/45% water mobile phase using biphenyl as the analyte. For the 2.1 mm ID×50 mm length column, the minimum reduced plate heights of the exemplary inventive particles and their MLBML counterparts are 1.50 and 1.81, respectively. For the 3.0 mm ID×100 mm length, the minimum reduced plate heights of the exemplary inventive particles and their MLBML counterparts are 1.24 and 1.50, respectively. These results indicate that the superficially porous particles 100 disclosed herein are suitable for the manufacture of extremely efficient HPLC columns, which outperform their conventional counterparts. Without being bound by theory, it is believed that the extremely efficient chromatographic separations of the superficially porous particles 100 of the present disclosure is due in significant part to their radial pore orientation, leading to a very small longitudinal diffusion coefficient B term in the van Deemter equation.

EXAMPLES

Example 1

Silica core particles were synthesized substantially in accordance with U.S. Pat. No. 4,775,520. The number median average particle diameter was 2.05 μm. The core particle diameter after sintering at 900° C. was reduced to approximately 1.85 μm.

For the porous inner layer 106 preparation, 18 g of core particles were mixed with 500 mL water that also contained 13 g cetyltrimethylammonium bromide ("CTAB") and 8 g urea in a three neck 2 L flask. The mixture was sonicated approximately 30 minutes to dissolve CTAB and urea and fully disperse silica core particles. Subsequently, 500 mL cyclohexane and 13 mL isopropanol were added to the solution to form the bi-phase system. After magnetic stirring the mixture at 200 rpm/min for 30 min, 15 mL TEOS was slowly added to the top cyclohexane phase while increasing the reaction temperature from 25° C. to 70° C. in about 20 minutes. The mixture was allowed to react for 14 hours under reflux conditions.

To prepare the first layer 130 of the at least one porous outer layer 108, the above cooled modified particles were first collected from the mixture by centrifugation and resuspended into 100 mL water, which was sonicated approximately 30 minutes to fully disperse the particles. At the same time, 13 g CTAB and 8 g urea were added together into 400 mL water in a three neck 2 L flask, which was sonicated approximately 5 minutes. The dispersed silica particles were then transferred into the CTAB, urea, and water mixture, which was sonicated approximately 5 minutes. Subsequently, 500 mL cyclohexane and 13 mL isopropanol were added to the above aqueous mixture to form the bi-phase system. After magnetic stirring the mixture at 200 rpm/min for 30 min, 18 mL TEOS was slowly added to the top cyclohexane phase while increasing the reaction temperature from 25° C. to 70° C. in about 20 minutes. The mixture was allowed to react for 24 hours under reflux conditions.

The LBL growth process was repeated two more times to make superficially porous particles 100 with a porous inner layer 106 and three layers 130 in the at least one porous outer layer 108. The product was then centrifuged, resuspended in water one time, and in 50% water/50% ethanol (v/v) two times. The product was dried at 100° C. and calcinated at 550° C. to remove the template. The particle size was 3.05 μm, determined by the Coulter counter method. The surface area, average pore size, and pore volume determined by nitrogen sorption analysis were 395 m²/g, 8.3 nm, and 0.74 cc/g.

To reduce or eliminate the pores that were less than 5 nm, 15 g of calcinated superficially porous particles 100 were dispersed in 150 mL water in a 250 mL bottle followed by the addition of 10 mL of 28% ammonia. The mixture was allowed to react for 2 hours at room temperature under 300 rpm/min magnetic stirring. The reaction mixture was then centrifuged, washed with water or water/ethanol mixture three times to obtain the pore modified superficially porous particles 100. To increase their mechanical stability, the pore modified superficially porous particles 100 were sintered at 900° C. for 10 hours. To regenerate the Si—OH groups on the pore surface, 10 g of the sintered superficially porous particles 100 were dispersed in 100 mL water in a 150 mL plastic bottle that also contained 1 g of $NH_4HF_2$. The mixture was allowed to react for 2 hours at room temperature under 300 rpm/min magnetic stirring. The reaction mixture was then centrifuged, washed with water or water/ethanol mixture three times to obtain the rehydroxylated superficially porous particles 100 for subsequent steps such as surface modification, column packing, and testing. The particle size was 2.67 μm determined by the Coulter counter method. The surface area, average pore size, and pore volume determined by nitrogen sorption analysis were 200 m$^2$/g, 9.1 nm, and 0.46 cc/g.

Example 2

Silica core particles were synthesized substantially in accordance with U.S. Pat. No. 4,775,520. The number median average particle was 1.59 μm. The core particle diameter after sintering at 875° C. was reduced to approximately 1.50 μm.

For the porous inner layer 106 preparation, 10 g of core particles were mixed with 300 mL water that also contained 10 g CTAB and 6 g urea in a three neck 1 L flask. The mixture was sonicated approximately 30 minutes to dissolve CTAB and urea and fully disperse silica core particles. Subsequently, 300 mL cyclohexane and 10 mL isopropanol were added to the solution to form the bi-phase system. After magnetic stirring the mixture at 210 rpm/min for 30 min, 12 mL TEOS was slowly added to the top cyclohexane phase while increasing the reaction temperature from 25° C. to 70° C. in about 20 minutes. The mixture was allowed to react for 5 hours under reflux conditions. The short reaction time was used to reduce the thickness of the inner porous layer 106.

To prepare the first layer 130 of the at least one porous outer layer 108, the above cooled modified particles were first collected from the mixture by centrifugation and resuspended into 50 mL water, which was sonicated approximately 30 minutes to fully disperse the particles. At the same time, 10 g CTAB and 6 g urea were added together into 250 mL water in a three neck 1 L flask, which was sonicated approximately 5 minutes. The dispersed silica particles were then transferred into the CTAB, urea, and water mixture, which was sonicated approximately 5 minutes. Subsequently, 300 mL cyclohexane and 10 mL isopropanol was added to the above aqueous mixture to form the bi-phase system. After magnetic stirring the mixture at 210 rpm/min for 30 min, 13 mL TEOS was slowly added to the top cyclohexane phase while increasing the reaction temperature from 25° C. to 70° C. in about 20 minutes. The mixture was allowed to react for 24 hours under reflux conditions.

The LBL growth process was repeated one more time to make superficially porous particles 100 with one porous inner layer 106 and two layers 130 of the at least one porous outer layer 108. The product was then centrifuged, resuspended in water one time, and in 50% water/50% ethanol (v/v) two times. The product was dried at 100° C. and calcinated at 550° C. to remove the template. The particle size was 1.96 μm, determined by the Coulter counter method. The surface area, average pore size, and pore volume determined by nitrogen sorption analysis were 147.9 m$^2$/g, 14.0 nm, and 0.46 cc/g.

To reduce or eliminate the pores that were less than 5 nm, 5 g of calcinated superficially porous particles 100 were dispersed in 50 mL water in a 100 mL bottle followed by the addition of 5 mL of 28% ammonia. The mixture was allowed to react for 2 hours at room temperature under 200 rpm/min magnetic stirring. The reaction mixture was then centrifuged, washed with water or water/ethanol mixture three times to obtain the pore modified superficially porous particles 100. To increase their mechanical stability, the pore modified superficially porous particles 100 were sintered at 875° C. for 10 hours. To regenerate the Si—OH groups on the pore surface, 4.5 g of the sintered superficially porous particles 100 were dispersed in 50 mL water in a 100 mL plastic bottle that also contained 0.5 g of NH$_4$HF$_2$. The mixture was allowed to react for 2 hours at room temperature under 200 rpm/min magnetic stirring. The reaction mixture was then centrifuged, washed with water or water/ethanol mixture three times to obtain the rehydroxylated superficially porous particles 100 for subsequent steps such as surface modification, column packing, and testing. The particle size was 1.81 μm, determined by the Coulter counter method. The surface area, average pore size, and pore volume determined by nitrogen sorption analysis are 80.7 m$^2$/g, 16.6 nm, and 0.25 cc/g.

Example 3

Silica core particles were synthesized substantially in accordance with U.S. Pat. No. 4,775,520. The number median average particle diameter was 1.75 μm. The core particle diameter after calcination at 550° C. was reduced to approximately 1.70 μm.

For the porous inner layer 106 preparation, 8 g of core particles were mixed with 275 mL water that also contained 8 g CTAB and 5 g urea in a three neck 1 L flask. The mixture was sonicated approximately 30 minutes to dissolve CTAB and urea and fully disperse the silica core particles. Subsequently, 275 mL cyclohexane and 8 mL 1-pentanol were added to the solution to form the bi-phase system. After magnetic stirring the mixture at 175 rpm/min for 30 min, 11 ml TEOS was slowly added to the top cyclohexane phase while increasing the reaction temperature from 25° C. to 77° C. in about 20 minutes. The mixture was allowed to react for 10 hours under reflux conditions.

To prepare the first layer 130 of the at least one porous outer layer 108, the above cooled superficially porous particles 100 were first collected from the mixture by centrifugation and resuspended into 75 ml water, which was sonicated approximately 30 minutes to fully disperse the particles. At the same time, 8 g CTAB and 5 g urea were added together into 200 mL water in a three neck 1 L flask, which was sonicated approximately 5 minutes. The dispersed silica particles were then transferred into the CTAB, urea, and water mixture, which was sonicated approximately 5 minutes. Subsequently, 275 mL cyclohexane and 8 mL 1-pentanol were added to the above aqueous mixture to form the bi-phase system. After magnetic stirring the mixture at 175 rpm/min for 30 min, 13 mL TEOS was slowly added to the top cyclohexane phase while increasing the reaction temperature from 25° C. to 77° C. in about 20 minutes. The mixture was allowed to react for 48 hours under reflux conditions.

The LBL process was repeated two more times to make superficially porous particles 100 with one porous inner layer 106 and three layers 130 of the at least one porous outer layer 108. The product was then centrifuged, resuspended in water one time, and in 50% water/50% ethanol (v/v) two times. The product was dried at 100° C. and calcinated at 550° C. to remove the template. The particle size was 2.75 μm determined by the Coulter counter method. The surface area, average pore size, and pore volume determined by nitrogen sorption analysis were 91.1 m$^2$/g, 22.2 nm, and 0.35 cc/g.

Example 4

This example demonstrates an embodiment with reduced thickness of the inner porous layer 106.

Silica core particles were synthesized substantially in accordance with U.S. Pat. No. 4,775,520. The number median average particle diameter was 1.20 μm. The core particle diameter after calcination at 550° C. was reduced to approximately 1.16 μm.

For the porous inner layer 106 preparation, 10 g of core particles were mixed with 300 mL water that also contained 10 g CTAB and 6 g urea in a three neck 1 L flask. The mixture was sonicated approximately 30 minutes to dissolve CTAB and urea and fully disperse silica core particles. Subsequently, 300 mL cyclohexane and 10 mL isopropanol were added to the solution to form the bi-phase system. After magnetic stirring the mixture at 210 rpm/min for 30 min, 6 mL TEOS was slowly added to the top cyclohexane phase while increasing the reaction temperature from 25° C. to 70° C. in about 20 minutes. The mixture was allowed to react for 5 hours under reflux conditions. Both a low concentration of TEOS and a short reaction time were used to control the thickness 110 of the inner porous layer 106 to be less than 50 nm.

To prepare a sole layer 130 of the at least one porous outer layer 108, the above cooled modified particles were first collected from the mixture by centrifugation and resuspended into 50 mL water, which was sonicated approximately 30 minutes to fully disperse the particles. At the same time, 10 g CTAB and 6 g urea were added together into 250 mL water in a three neck 1 L flask, which was sonicated approximately 5 minutes. The dispersed silica particles were then transferred into the CTAB, urea, and water mixture, which was sonicated approximately 5 minutes. Subsequently, 300 mL cyclohexane and 10 mL isopropanol was added to the above aqueous mixture to form the bi-phase system. After magnetic stirring the mixture at 210 rpm/min for 30 min, 13 mL TEOS was slowly added to the top cyclohexane phase while increasing the reaction temperature from 25° C. to 70° C. in about 20 minutes. The mixture was allowed to react for 24 hours under reflux conditions.

The product was then centrifuged, resuspended in water one time, and in 50% water/50% ethanol (v/v) two times. The product was dried at 100° C. and calcinated at 550° C. to remove the template. The particle size was 1.60 μm, determined by the Coulter counter method. The surface area, average pore size, and pore volume determined by nitrogen sorption analysis were 131.7 m2/g, 15.0 nm, and 0.41 cc/g.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A plurality of superficially porous particles, each of the plurality of superficially porous particles comprising:
   a solid core; and
   a layered porous shell disposed on and radially outward of the solid core;
   wherein:
   the layered porous shell includes a porous inner layer and a plurality of porous outer layers disposed on and radially outward of the porous inner layer, each of the plurality of porous outer layers being distinct from one another across an interlayer boundary;
   the layered porous shell includes a first inorganic oxide;
   the porous inner layer includes an inner layer thickness of less than 300 nm;
   the plurality of porous outer layers includes a cumulative outer layer thickness ranging from 1 to 100 times the inner layer thickness;
   the layered porous shell constitutes from 10 vol % to 90 vol % of the plurality of superficially porous particles;
   the plurality of porous outer layers includes a predominately radial pore orientation;
   the plurality of porous outer layers includes an outer layer pore structure which is more organized than an inner layer pore structure of the porous inner layer;
   the layered porous shell includes a fibrous shell skeleton having a shell skeleton thickness greater than 1 nm; and
   the layered porous shell includes at least one structural or physical characteristic selected from the group consisting of layer thickness, skeleton thickness, pore orientation, pore size distribution, pore size, pore volume, surface area, and density which changes between the porous inner layer and the plurality of porous outer layers.

2. The plurality of superficially porous particles of claim 1, wherein the plurality of porous outer layers includes from 2 to 30 layers.

3. The plurality of superficially porous particles of claim 1, wherein the first inorganic oxide includes silica.

4. The plurality of superficially porous particles of claim 1, wherein the solid core includes a second inorganic oxide.

5. The plurality of superficially porous particles of claim 4, wherein first inorganic oxide is the same as the second inorganic oxide.

6. The plurality of superficially porous particles of claim 1, wherein the plurality of superficially porous particles includes a number average particle size ranging from 0.5 μm to 100 μm with a particle size distribution (one standard deviation) of less than 10% from average.

7. The plurality of superficially porous particles of claim 1, wherein the plurality of superficially porous particles includes an average pore size ranging from 4 nm to 100 nm.

8. The plurality of superficially porous particles of claim 1, wherein the plurality of superficially porous particles includes a specific surface area ranging from 10 m$^2$/g to 800 m$^2$/g.

9. The plurality of superficially porous particles of claim 1, wherein the plurality of superficially porous particles includes a specific pore volume ranging from 0.05 cm$^3$/g to 2.0 cm$^3$/g.

10. The plurality of superficially porous particles of claim 1, wherein the plurality of superficially porous particles includes a density ranging from 0.2 g/cm$^3$ to 2 g/cm$^3$.

11. The plurality of superficially porous particles of claim 1, further including a plurality of functionalized surface groups selected from the group consisting of alkyl groups, alkynl groups, aryl groups, diol groups, amino groups, alcohol groups, amide groups, cyno groups, ether groups, nitro groups, carbonyl groups, epoxide groups, sulfonyl groups, cation exchanger groups, anion exchanger groups, carbamate groups, urea groups, and combinations thereof.

12. The plurality of superficially porous particles of claim 1, wherein the plurality of superficially porous particles is a chromatographic stationary phase.

13. A bi-phase layer-by layer process for forming the plurality of superficially porous particles of claim 1, comprising:

(a) mixing an aqueous bottom phase and an organic top phase for a mixing duration to form a bi-phase mixture, wherein:
   the aqueous bottom phase includes a plurality of core particles (or modified core particles in (e)), a template, and a catalyst; and
   the organic top phase includes an organic solvent and a silane precursor;
(b) heating the bi-phase mixture under reflux conditions for a refluxing duration to form modified core particles;
(c) cooling the bi-phase mixture to room temperature;
(d) separating the plurality of modified core particles from the bi-phase mixture; and
(e) repeating (a)-(d).

14. The process of claim 13, wherein at least one of the aqueous bottom phase and the organic top phase includes a co-solvent.

15. The process of claim 14, wherein the co-solvent includes at least isopropanol.

16. The process of claim 13, wherein the plurality of core particles includes silica.

17. The process of claim 13, wherein the template includes cetyltrimethylammonium bromide.

18. The process of claim 13, wherein the catalyst includes urea.

19. The process of claim 13, wherein the organic solvent is cyclohexane.

20. A post-modification process for forming superficially porous particles with chromatographically enhanced properties from the plurality of superficially porous of claim 1, the post-modification comprising at least one of:
   i. removing a template by at least one of calcination and extraction;
   ii. increasing pore size and eliminating small mesopores (<5 nm) by at least one of a hydrothermal method and etching;
   iii. increasing a mechanical strength of the superficially porous particles by sintering;
   iv. activating a plurality of functional surface groups by at least one of the hydrothermal method and etching; and
   v. functionalizing a plurality of surface groups of the plurality of superficially porous particles 100 with organic silanes to form a plurality of functionalized surface groups.

* * * * *